United States Patent
Aoyama et al.

(10) Patent No.: US 8,054,333 B2
(45) Date of Patent: Nov. 8, 2011

(54) APPARATUS, METHOD AND PROGRAM FOR RECEIVING PRINTING ORDERS

(75) Inventors: Tatsuya Aoyama, Kanagawa-ken (JP); Yukita Gotohda, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 480 days.

(21) Appl. No.: 12/159,380

(22) PCT Filed: Dec. 26, 2006

(86) PCT No.: PCT/JP2006/326344
§ 371 (c)(1),
(2), (4) Date: Aug. 19, 2008

(87) PCT Pub. No.: WO2007/074931
PCT Pub. Date: Jul. 5, 2007

(65) Prior Publication Data
US 2010/0220198 A1  Sep. 2, 2010

(30) Foreign Application Priority Data

Dec. 27, 2005  (JP) .................................. 2005-374513

(51) Int. Cl.
*H04N 5/225* (2006.01)
(52) U.S. Cl. ................... 348/207.1; 348/207.2; 348/552
(58) Field of Classification Search ............... 348/207.1, 348/552; 358/1.11–1.16; 355/27–29, 40, 355/41
See application file for complete search history.

(56) References Cited

U.S. PATENT DOCUMENTS

| | | | |
|---|---|---|---|
| 5,742,855 A * | 4/1998 | Saito et al. ................... 396/311 |
| 5,745,220 A * | 4/1998 | Okazaki et al. ................ 355/54 |
| 7,009,728 B1 * | 3/2006 | Hara et al. ................... 358/1.16 |
| 7,038,714 B1 | 5/2006 | Parulski et al. |
| 2003/0059202 A1 * | 3/2003 | Yoda .............................. 386/69 |
| 2003/0193578 A1 * | 10/2003 | Parulski et al. ........... 348/220.1 |
| 2004/0212832 A1 * | 10/2004 | Shibata ....................... 358/1.16 |
| 2004/0257611 A1 | 12/2004 | Kito |

FOREIGN PATENT DOCUMENTS

| | | |
|---|---|---|
| EP | 1 087 607 | 3/2001 |
| JP | 2002-501252 A | 1/2002 |
| JP | 2003-244585 A | 8/2003 |
| JP | 2003-259260 A | 9/2003 |
| JP | 2004-120601 A | 4/2004 |
| JP | 2004-242316 A | 8/2004 |
| WO | WO-99/38087 A2 | 7/1999 |

* cited by examiner

*Primary Examiner* — Yogesh Aggarwal
(74) *Attorney, Agent, or Firm* — Birch, Stewart, Kolasch & Birch, LLP

(57) ABSTRACT

A print order can be placed easily by use of a printing order reception apparatus. A printing order reception apparatus 1 has slots 3A to 3F for inserting therein various types of recording media and a digital camera including a recording medium. When the digital camera is inserted in the slot 3A therefor, printing processing is carried out according to a predetermined printing condition. When a recording medium is inserted in a corresponding one of the remaining slots, ordinary printing processing is executed wherein a user specifies an image to print, a print size, and a quantity.

8 Claims, 8 Drawing Sheets

APPARATUS, METHOD AND PROGRAM FOR RECEIVING PRINTING ORDERS

TECHNICAL FIELD

The present invention relates to a printing order reception apparatus installed in a DPE store or the like for receiving print orders regarding images stored in recording media or equipment such as digital cameras including recording media. The present invention also relates to a printing order reception method therefor and a program for causing a computer to execute the printing order reception method.

BACKGROUND ART

In the case where an image photographed by a digital camera is printed from a home printer installed at a user's home, the image is generally input to a personal computer and printed by use of a printer driver of the personal computer. In some cases, a digital camera is connected directly to a printer for printing without involving a personal computer. In other cases, an image photographed by a digital camera is recorded in a recording medium such as a memory card, and a printer prints the image by reading the image stored in the recording medium.

A printer has been proposed for printing an image photographed by a digital camera by use of a home printer (see Japanese Unexamined Patent Publication No. 2003-259260). The printer includes a mount having a connection terminal corresponding to a connection terminal of the digital camera, and the digital camera is placed on the mount. The image is read from a recording medium inserted in the digital camera, and the printer prints the image. Furthermore, a system has been proposed for setting printing mode of a printer according to a state of a digital camera through detection of a state of a display unit or the power thereof (see Japanese Unexamined Patent Publication No. 2003-244585).

However, a user cannot print an image obtained by a digital camera at home if he/she does not use a personal computer or a printer. Even in the case where a user uses a personal computer or a printer, the user needs to set up the printer or a digital camera by himself/herself. Consequently, many users think that printing is troublesome.

For this reason, a service has been provided for image printing at DPE stores by bringing recording media storing images therein to the DPE stores. In addition, a service has been provided for enabling users to carry out printing without involving a store clerk by using printing order reception apparatuses such as that described in Japanese Unexamined Patent Publication No. 2002-501252 installed in DPE stores.

However, even for a print order using the printing order reception apparatus described above, a user needs to select an image to print and printing conditions such as a print size and quantity while using a screen of the apparatus. Therefore, a person who is not familiar with the printing order reception apparatus thinks that an operation for specifying the printing conditions is troublesome. Consequently, printing using the printing order reception apparatus is as troublesome as an operation for printing using a home printer.

The present invention has been conceived based on consideration of the above circumstances. An object of the present invention is therefore to enable a user to easily place a print order by using a printing order reception apparatus.

DISCLOSURE OF THE INVENTION

A printing order reception apparatus of the present invention comprises:

display means for carrying out various kinds of display for a print order;

input means for carrying out various kinds of input for the print order;

a plurality of types of slots for inserting therein various types of recording media each storing an image and equipment including a recording medium storing an image; and printing control means for executing printing processing according to a predetermined printing condition in the case where a specific one of the slots has a corresponding one of the recording media or the equipment inserted therein, regarding the image stored in the recording medium or the recording medium in the equipment.

The equipment including the recording medium refers to equipment having the recording medium installed inside where the image is recorded and not having a slot for insertion of a recording medium.

The specific one of the slots refers to a slot that causes the printing processing to be executed according to the predetermined printing condition upon insertion of the recording medium or the equipment into the slot. Since some users do not wish to execute the printing processing according to the predetermined printing condition, two slots each may be prepared for the same type of recording medium or equipment so that one of the two slots can be used as the specific slot.

The predetermined printing condition refers to a printing condition that is predetermined and cannot be changed. More specifically, the predetermined printing condition refers to a printing condition for printing only one L-size print, for example.

The printing processing refers to printing the image and to causing the image to be printable. For example, in the case where the printing order reception apparatus of the present invention comprises a printer, the printing processing refers to printing the image from the printer. In the case where the printing order reception apparatus of the present invention does not have a printer but is connected to an external printer, the printing processing refers to outputting the image to the external printer. Image processing for improving image quality may be included in the printing processing.

In the printing order reception apparatus of the present invention, the printing control means may display a screen on the display means for accepting whether to execute the printing processing according to the predetermined printing condition so that the printing control means can execute the printing processing in the case where an instruction to execute the printing processing has been input from the input means.

In the printing order reception apparatus of the present invention, the equipment may be a digital camera having a predetermined interface. In this case, the specific slot has an interface corresponding to the predetermined interface.

In the printing order reception apparatus of the present invention, the printing control means may delete the image from the recording medium included in the digital camera after execution of the printing processing.

In this case, the printing control means may display a screen on the display means for accepting whether to delete the image so that the printing control means can delete the image in the case where an instruction to delete the image has been input from the input means.

In this case, the printing order reception apparatus may further comprise storage means for storing the image to be deleted.

In addition, the printing order reception apparatus of the present invention may comprise image recording means for recording the image to be deleted in an optical recording medium that enables optical recording therein.

In this case, the image recording means may display a screen on the display means for accepting whether to record the image in the optical recording medium so that the image recording means can record the image in the optical recording medium in the case where an instruction to record the image in the optical recording medium has been input from the input means.

Furthermore, in this case, the printing order reception apparatus may comprise means for printing an index image having an optically readable mark area for a print order on a surface of the optical recording medium. In this case, one of the slots is a slot for the optical recording medium and has reading means for reading the mark area of the index image. The printing control means then executes the printing processing according to information of the mark area having been read.

A printing order reception method of the present invention is a printing order reception method for a printing order reception apparatus having:

display means for carrying out various kinds of display for a print order;

input means for carrying out various kinds of input for the print order; and a plurality of types of slots for inserting therein various types of recording media each storing an image and equipment including a recording medium storing an image. The printing order reception method comprises the step of:

executing printing processing according to a predetermined printing condition in the case where a specific one of the slots has a corresponding one of the recording media or the equipment inserted therein, regarding the image recorded in the recording medium or the recording medium in the equipment.

The printing order reception method of the present invention may be provided as a program for causing a computer to execute the method.

According to the present invention, the printing processing is carried out according to the predetermined printing condition on the image stored in the recording medium or the recording medium included in the equipment when the recording medium or the equipment is inserted in the specific slot. Therefore, a print can be obtained according to the predetermined printing condition only if the recoding medium or the equipment is inserted in the specific slot. Consequently, a user can obtain the print according to the predetermined printing condition without carrying out a troublesome operation.

Furthermore, if the screen for accepting whether to execute the printing processing according to the predetermined printing condition is displayed on the display means and the printing processing is carried out in the case where the instruction to execute the printing processing has been input from the input means, the user can decide whether to execute the printing processing according to the predetermined printing condition. Therefore, erroneous execution of the printing processing according to the predetermined printing condition can be prevented.

If the equipment is the digital camera having the predetermined interface and the specific slot has the interface corresponding to the predetermined interface, the print according to the predetermined printing condition can be obtained from the digital camera immediately after photography.

By deleting the image from the recording medium included in the digital camera after execution of the printing processing, photography can be newly carried out with the digital camera immediately thereafter.

In this case, if the screen for accepting whether to delete the image is displayed on the display means and the image is deleted in the case where the instruction to delete the image has been input from the input means, the user can decide whether to delete the image. Therefore erroneous deletion of the image from the recording medium included in the digital camera can be prevented.

By storing the image to be deleted, a print order can be placed later by using the image even in the case where the image has erroneously been deleted from the recording medium in the digital camera.

By recording the image to be deleted in the optical recording medium for optical recording, a print order can be placed by use of the optical recording medium. In addition, the image stored in the optical recording medium can be viewed or manipulated on a personal computer.

In this case, if the screen for accepting whether to record the image in the optical recording medium is displayed on the display means and the image is recorded in the optical recording medium only in the case where the instruction to record the image in the optical recording medium has been input from the input means, the user can decide whether to record the image to be deleted in the optical recording medium. In this manner, the user can be prevented from being billed for erroneous recording of the image in the optical recording medium especially in the case where the optical recording medium is not free of charge.

If the index image having the optically readable mark area for a print order is printed on the surface of the optical recording medium and one of the slots is the slot for the optical recording medium that can read the mark area of the index image, the user can place a print order only if he/she inserts the optical recording medium into the slot.

BEST MODE FOR CARRYING OUT THE INVENTION

Figure 1:
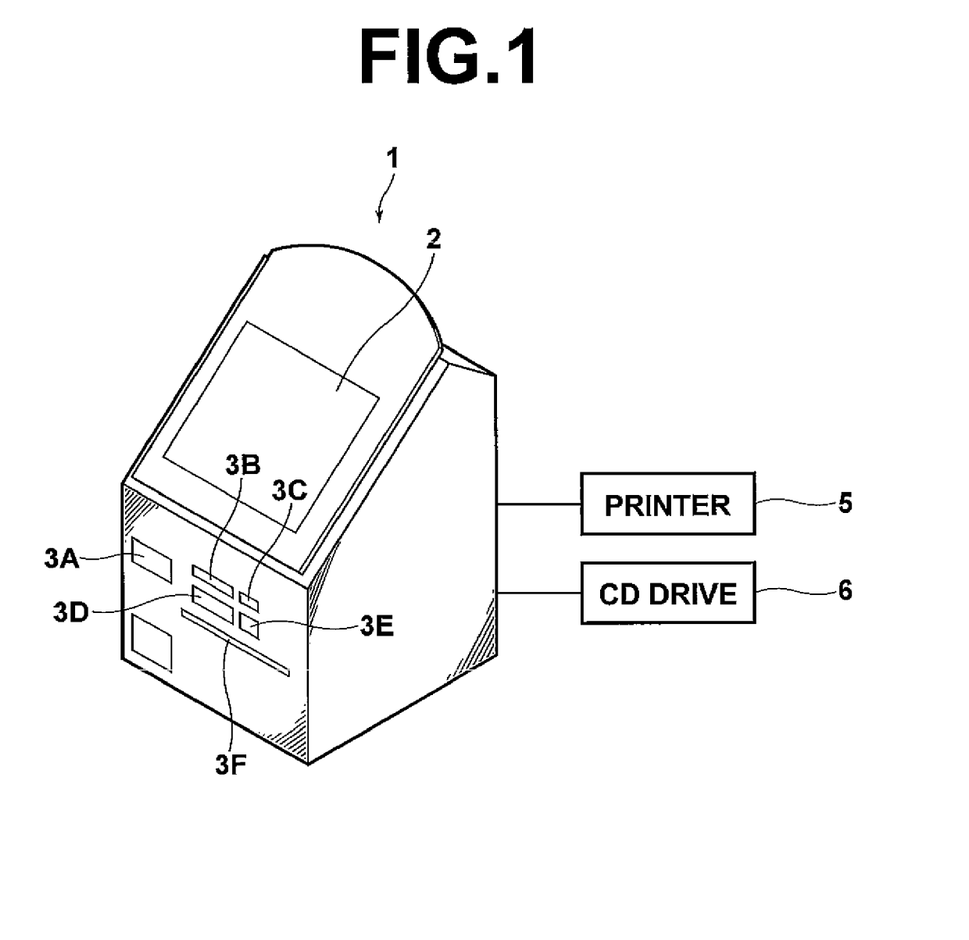
FIG. 1 shows a printing order reception apparatus of an embodiment of the present invention.

Hereinafter, an embodiment of the present invention is described with reference to the accompanying drawings. FIG. 1 shows a printing order reception apparatus of the embodiment of the present invention. As shown in FIG. 1, a printing order reception apparatus 1 in this embodiment has a touch panel monitor 2 for carrying out various kinds of display for a print order and for receiving various kinds of input, in addition to slots 3A to 3F for insertion of various types of recording media and a digital camera including a recording medium that stores images. The printing order reception apparatus 1 is connected to a printer 5 for printing an image and to a CD drive 6 for writing an image in a CD. In FIG. 1, the printing order reception apparatus 1 is connected directly to the printer 5 and the CD drive 6. However, the printer 5 and the CD drive 6 may be located in a different place from the printing order reception apparatus 1 and connected to the apparatus 1 via a network or other means.

Figure 2:
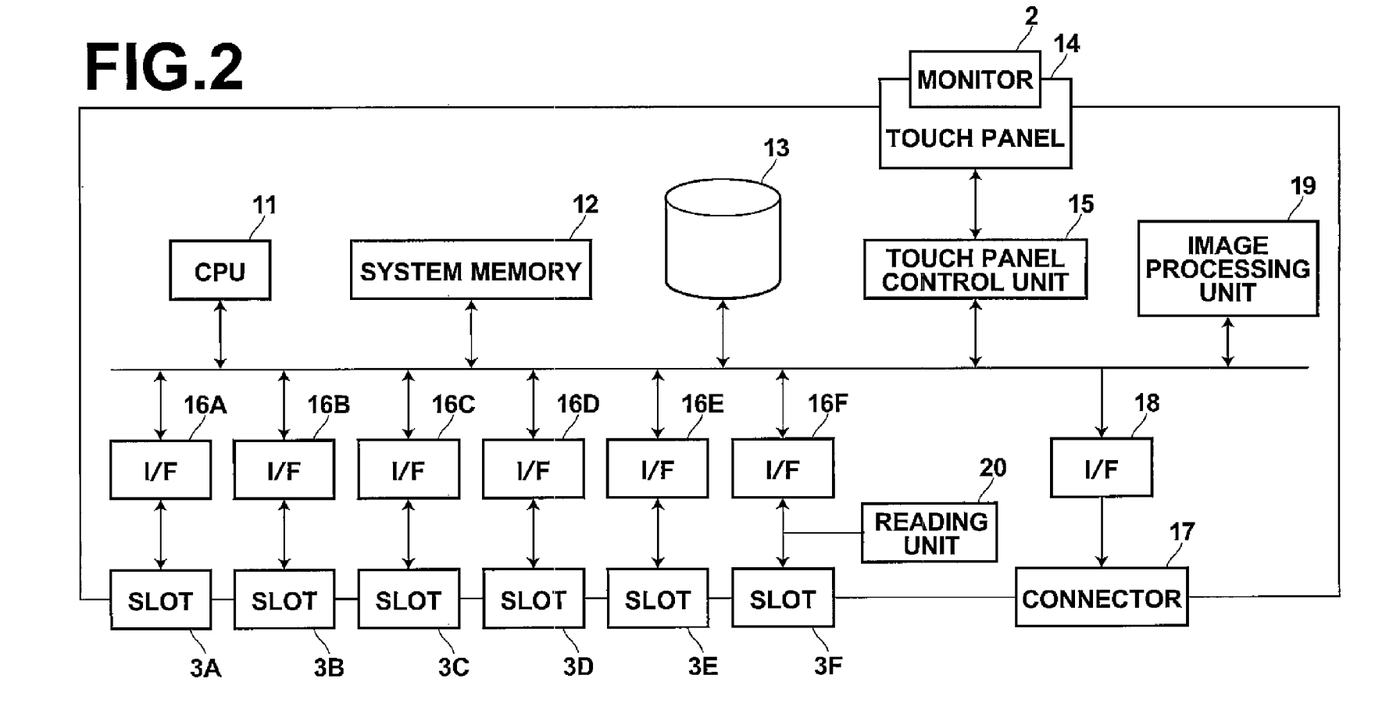
FIG. 2 is a block diagram showing a signal processing system of the printing order reception apparatus in the embodiment.

FIG. 2 is a block diagram showing a signal processing system of the printing order reception apparatus 1 in the embodiment. The printing order reception apparatus 1 comprises a CPU 11 for controlling operation of the printing order reception apparatus 1, a system memory 12 comprising a ROM that stores a program executed by the CPU 11 and a RAM as a workspace, and a storage unit 13 such as a hard disc for storing the images read from the recording medium as will be described later. The images stored in the storage unit 13 are deleted from the storage unit 13 after a predetermined time has elapsed.

The printing order reception apparatus 1 also has the monitor 2, a touch panel 14 for the various kinds of input via the monitor 2, a touch panel control unit 15 for controlling the touch panel 14, interfaces 16A to 16F respectively corresponding to the slots 3A to 3F, a connector 17 for connecting the printer 5 and the CD drive 6, and an output interface 18 connected to the connector 17.

The printing order reception apparatus 1 further comprises an image processing unit 19 for carrying out image processing such as gradation processing and sharpness processing on images read from the recording media or the like.

The slot 3F is a slot for CDs, and has a reading unit 20 for reading a mark area of an index image printed on a surface of a CD as will be described later.

Figure 3:
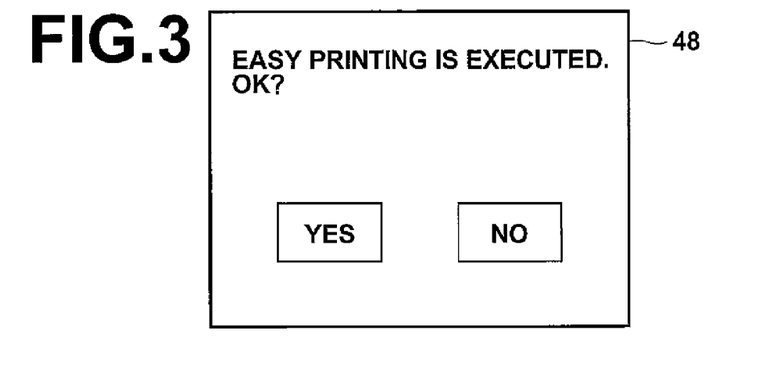
FIG. 3 shows a printing execution screen.

The slot 3A is a slot for the digital camera including the recording medium. In this embodiment, in the case where the digital camera has been inserted in the slot 3A, printing processing is carried out on all the images recorded in the recording medium of the digital camera according to predetermined printing conditions (hereinafter referred to as easy printing conditions) without specification of an image to print, a print size, and a quantity by a user. In this case, a printing execution screen 48 may be displayed on the monitor 2 including a message reading "Easy Printing is Executed. OK?" as well as YES and NO buttons as shown in FIG. 3 so that the printing processing according to the easy printing conditions can be carried out in the case where the YES button has been selected.

The printing processing is processing for outputting the images from the printer 5 after the image processing unit 19 has carried out the image processing on the images. In the case where the printing order reception apparatus has the printer, the printing processing is the processing for outputting the images from the printer 5.

Figure 4:
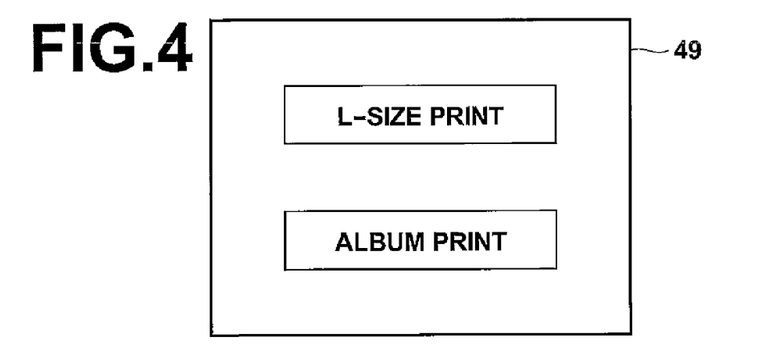
FIG. 4 shows a printing selection screen.

Some digital cameras enable generation of a photo album by arranging all images obtained through photography, depending on the type thereof. Therefore, as shown in FIG. 4, a printing selection screen 49 may be displayed for selection between printing conditions for L-size printing for all the images in the recording medium of the digital camera and printing conditions for printing a 2L-size photo album generated by the digital camera, in the case where the digital camera has been inserted in the slot 3A. The printing processing is carried out according to the selected printing conditions.

In the case where one of the recording media has been inserted in a corresponding one of the slots 3B to 3F other than the slot 3A, ordinary printing processing is carried out. In the ordinary printing processing, a catalog of images recorded in the recording medium is displayed on the monitor 2 and a user specifies which of the images to print. The user further specifies a print size and a quantity for the specified image, and the image processing unit 19 carries out the image processing on the specified image. Thereafter, the image is printed according to the specified size and quantity.

Figure 5:
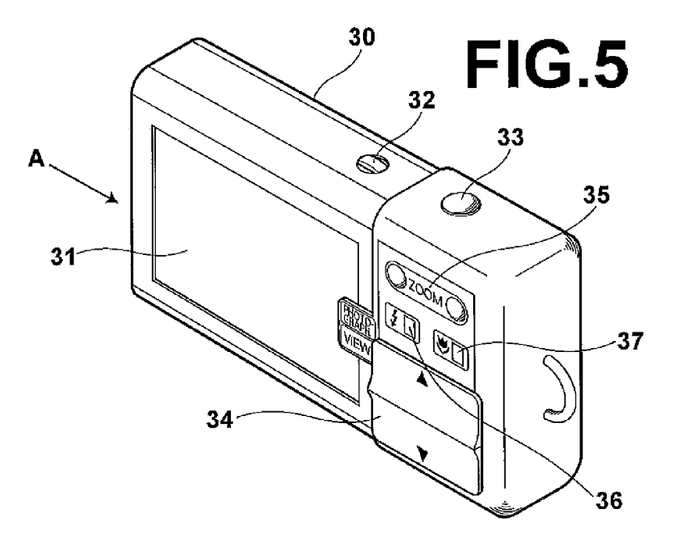
FIG. 5 is an oblique rear side view of a digital camera including a recording medium (part 1)
Figure 6:
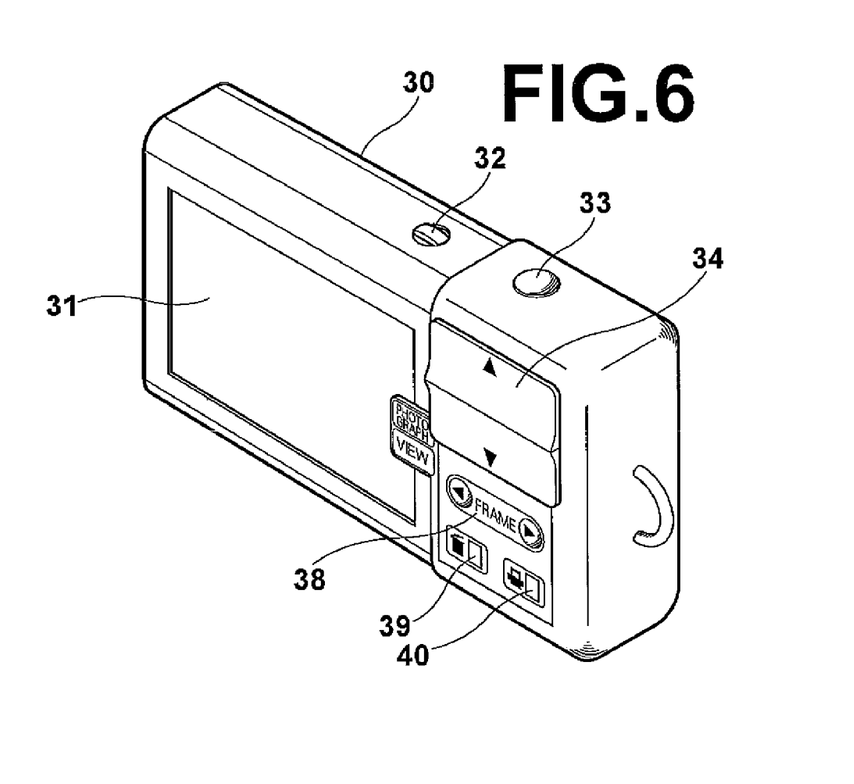
FIG. 6 is an oblique rear side view of the digital camera including the recording medium (part 2)
Figure 7:
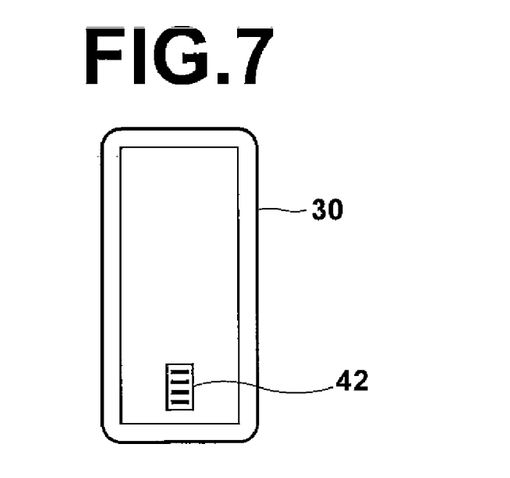
FIG. 7 is a view from the direction shown by an arrow A in FIG. 5.

FIGS. 5 and 6 are oblique rear side views of the digital camera having the recording medium, and FIG. 7 is a view from the direction of an arrow A shown in FIG. 5. As shown in FIGS. 5 and 6, a digital camera 30 comprises a monitor 31 for various kinds of display such as photographed images, a power switch 32 for switching on and off the power, a release button 33, and a mode changing switch 34 for changing mode of the camera 30 between photography mode and playback mode.

In the case where the mode changing switch 34 is at the position of the photography mode, zoom button 35 for zooming, a flash button 36 for switching on and off a flash, and a Macro button 37 for carrying out macro photography appear at the rear of the digital camera 30. The user appropriately operates the buttons for photography, and can record the images obtained through the photography in the recording medium included in the digital camera 30.

In the case where the mode changing switch 34 is at the position of playback mode, a Frame button 38 for feeding an image to be played back, a Delete button 39 for deleting the image being played back, and a Reserve Print button 40 for reserving printing of the image being played back appear at the rear of the digital camera 30. The user can play back the images recorded in the recording medium included in the digital camera 30 by appropriately operating the buttons.

An interface 42 is positioned on the left side of the digital camera 30 viewed from the rear thereof, for connection to the interface 16A upon insertion in the slot 3A.

The CPU 11 functions as printing control means by execution of the program stored in the system memory 12.

Figure 8:
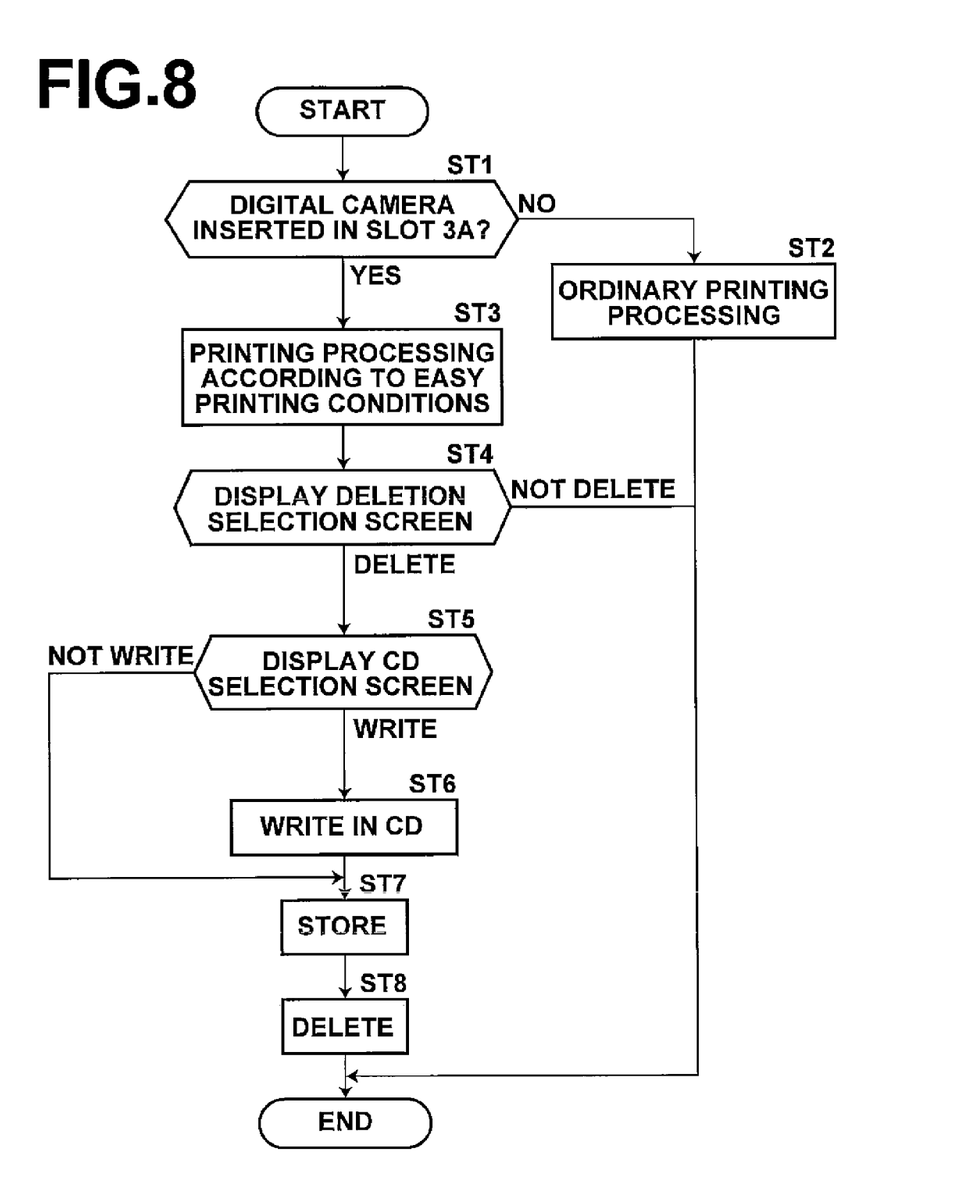
FIG. 8 is a flow chart showing procedures carried out in the embodiment.

Procedures carried out in this embodiment are described next. FIG. 8 is a flow chart showing a flow of processing carried out in this embodiment. When the user sets the recording medium or the digital camera 30 in any one of the slots 3A to 3F, the CPU 11 starts the processing. The CPU 11 firstly judges whether the digital camera 30 has been inserted in the slot 3A (Step ST1). If a result at Step ST1 is negative, the ordinary printing processing is carried out (Step ST2).

If the result at Step ST1 is affirmative, the printing processing according to the easy printing conditions is carried out (Step ST3).

Figure 9:
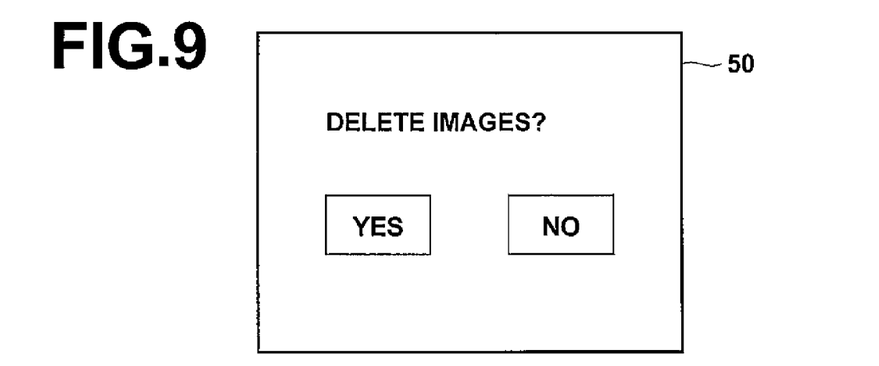
FIG. 9 shows a deletion selection screen.

After the printing processing has been completed according to the easy printing conditions, a deletion selection screen is displayed on the monitor 2 for letting the user select whether to delete the images recorded in the recording medium of the digital camera 30 (Step ST4). FIG. 9 shows the deletion selection screen. As shown in FIG. 9, a message reading "Delete Images?" is displayed in a deletion selection screen 50, together with YES and NO buttons. If the user selects the YES button, a CD selection screen is displayed on the monitor 2 for letting the user select whether to write the image to be deleted in the CD (Step ST5).

Figure 10:
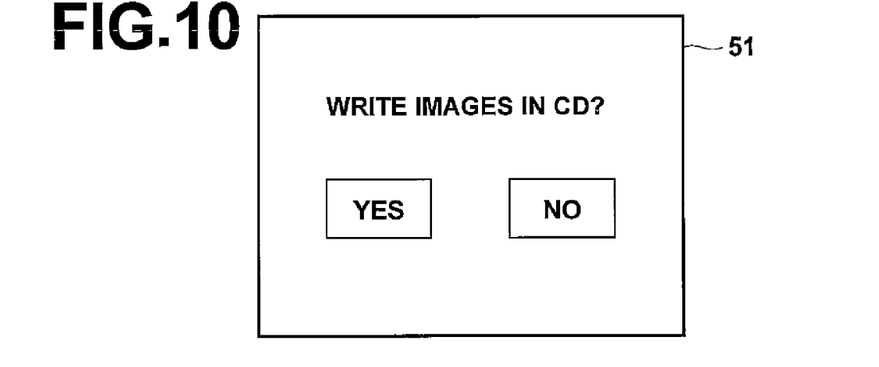
FIG. 10 shows a CD selection screen.

FIG. 10 shows the CD selection screen. As shown in FIG. 10, a CD selection screen 51 includes a message reading "Write Images in CD?" in addition to YES and NO buttons. The CD selection screen 51 may also include various kinds of information such as information notifying the user whether recording in the CD is free or for pay, information on a charge if the recording is not free, and information related to the recording. When the user selects the YES button, the images stored in the recording medium of the digital camera 30 are sent to the CD drive 6 and written in the CD (Step ST6). The images in the recording medium are stored in the storage unit 13 (Step ST7), and deleted from the recording medium (Step ST8) to end the flow of processing. The printer 5 prints the index image comprising a catalog of thumbnail images generated from the images recorded in the CD, on the surface of the CD storing the images.

In the case where the user has selected the NO button in the CD selection screen 51, the flow of processing goes to Step ST7 without writing the images in the CD, and the procedures from Step ST7 are carried out. In the case where the user has selected the NO button in the deletion selection screen 50, the flow of processing ends.

Figure 11:
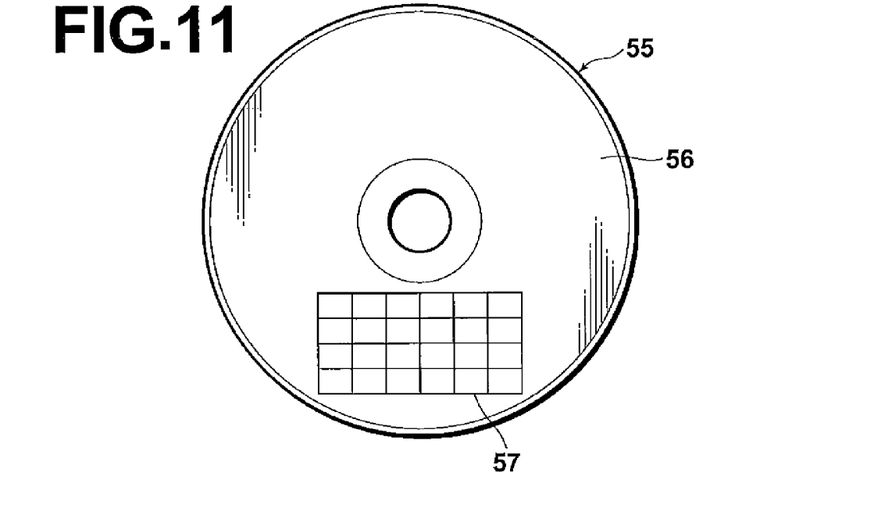
FIG. 11 shows a surface of a CD whereon images have been recorded in the embodiment.

FIG. 11 shows the surface of the CD storing the images written in this embodiment. As shown in FIG. 11, an index image 57 comprising the catalog of the thumbnail images regarding the images in a CD 55 is printed on a surface 56 of the CD 55 storing the images.

Figure 12:
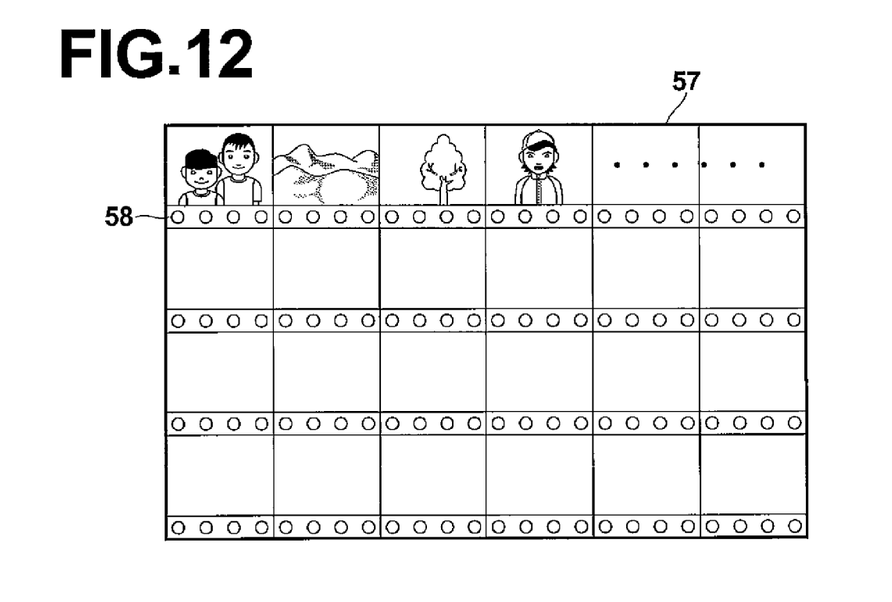
FIG. 12 shows an index image in detail.

FIG. 12 shows the index image 57 in detail. As shown in FIG. 12, the index image 57 comprises the thumbnail images arranged in order. Under each of the thumbnail images is added a mark area 58 that enables the user to input whether the image is necessary for printing. Each of the mark areas 58 has 4 marks, and the user can specify the quantity of prints by filling in the marks with a pencil or the like, up to the number corresponding to the quantity.

The arrangement of the thumbnail images is not necessarily limited to the example shown in FIG. 12, and any arrangement can be used as long as the surface of the CD can be used efficiently. The number of the marks for each of the thumbnail images is not necessarily limited to 4, and may be determined according to necessity.

In the case where the user has written the images in the CD 55, the user fills in the mark or marks of the mark area or areas 58 corresponding to the image or images he/she wishes to print, up to the desired quantity. By inserting the CD 55 into the CD slot 3F of the printing order reception apparatus 1, the reading unit 20 reads the mark areas 58 of the index image 57. The CPU 11 judges how many prints are necessary for which of the images, according to information read from the mark areas 58 indicated by a position and the number of the marks having been filled in. The CPU 11 then reads the image or images to be printed from the CD 55, for outputting the prints from the printer 5.

As has been described above, according to this embodiment, the images stored in the recording medium of the digital camera 30 are printed according to the easy printing conditions when the digital camera 30 is inserted in the slot 3A therefor. In this manner, the prints can be obtained according to the easy printing conditions only if the user sets the digital camera 30 in the slot 3A. Therefore, the user can obtain the prints according to the easy printing conditions without carrying out a troublesome operation.

By executing the printing processing according to the easy printing conditions in the case where the user has selected the YES button after display of the printing execution screen 48 on the monitor 2 for accepting whether to execute the printing processing according to the easy printing conditions as shown in FIG. 3, the user can decide whether to execute the printing processing according to the easy printing conditions. Consequently, erroneous execution of the printing processing according to the easy printing conditions can be avoided.

Furthermore, by deleting the images from the recording medium included in the digital camera 30 after execution of the printing processing, photography with the digital camera 30 can be newly carried out immediately thereafter.

In this case, by deleting the images in the case where the YES button has been selected after display of the deletion selection screen 50 on the monitor 2 for accepting whether to delete the images as shown in FIG. 9, the user can decide whether to delete the images. Consequently, erroneous deletion of the images from the recording medium of the digital camera 30 can be prevented.

By storing the image to be deleted in the storage unit 13, a print order using the images can be placed even after the images have been deleted from the recording medium of the digital camera 30 by mistake. In this case, a storage period for the images may be determined in consideration of capacity of the storage unit 13 and notified to the user if he/she does not record the images in the CD. This notification may be carried out by providing the user with a sheet printed with the notification or by display in the deletion selection screen 50.

By recording the image to be deleted in the CD 55, a print order using the CD 55 can be placed. In addition, the images in the CD 55 can be viewed and manipulated by use of a personal computer.

In this case, as shown in FIG. 10, the CD selection screen 51 may be displayed on the monitor 2 for accepting whether to record the images in the CD 55. In the case where the YES button has been selected, the images are recorded in the CD 55. In this manner, the user can decide whether to record the images to be deleted in the CD 55. Especially, in the case where the CD 55 is not free, the user can be prevented from being charged for erroneous recording of the images in the CD 55.

Furthermore, by recording the index image 57 including the optically readable mark areas 58 for a print order on the surface 56 of the CD 55 and by reading the mark areas 58 of the index image 57 with the CD slot 3F, the user can place a print order of the images in the CD 55 only by inserting the CD 55 in the slot 3F.

In the embodiment described above, the images deleted from the recording medium of the digital camera 30 are recorded in the CD. However, the images may be recorded in a DVD.

Figure 13:
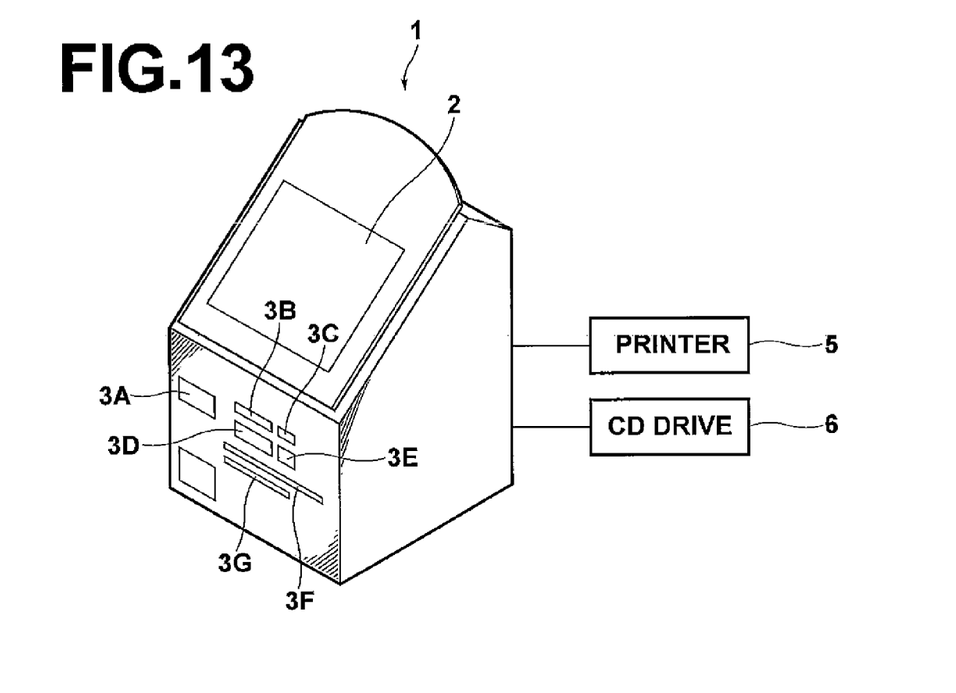
FIG. 13 shows the printing order reception apparatus having a slot for an index sheet.

In the above embodiment, the index image 57 is printed on the surface 56 of the CD 55. However, the index image 57 may be printed alone on paper for generating an index sheet so that a print order can be placed by using the mark areas on the index sheet. In this case, as shown in FIG. 13, the printing order reception apparatus 1 has a slot 3G for the index sheet for reading the information from the index sheet. Therefore, the slot 3G has the reading unit 20 of the slot 3F in the printing order reception apparatus 1 shown in FIG. 1.

On the surface of the CD 55 may be printed a bar code or a QR code describing link information representing a storage location of image data representing the index image 57 (hereinafter referred to as index data). Upon necessity, the bar code or the QR code is read at the DPE store for accessing the storage location of the index data. In this manner, the index data are obtained and printed so that the user can receive the index sheet. Alternatively, when the CD 55 is inserted in the printing order reception apparatus 1, the index sheet may be output from the printer 5. In this manner, the index sheet can be prevented from being printed unnecessarily by mistake.

Figure 14:
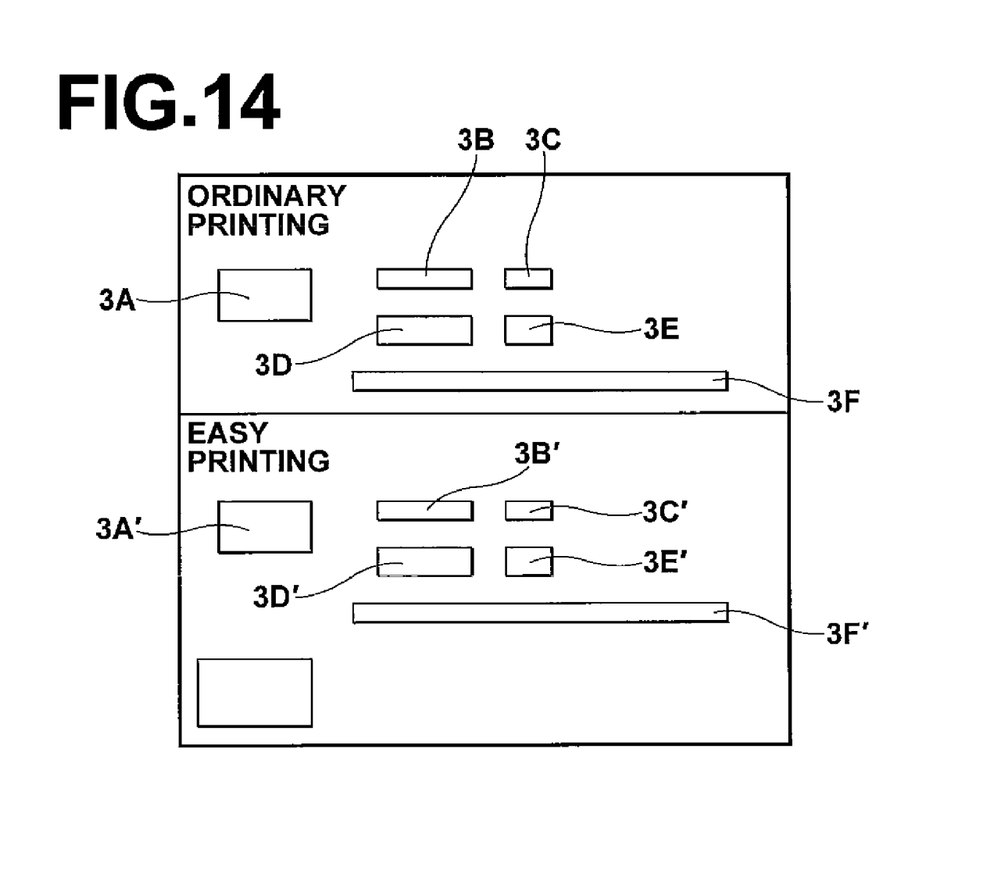
FIG. 14 shows a state wherein the printing order reception apparatus has slots 3A' to 3F' corresponding to slots 3A to 3F.

In the above embodiment, the printing processing according to the easy printing conditions is carried out when the digital camera 30 is inserted in the slot 3A therefor. However, as shown in FIG. 14, the printing order reception apparatus 1 may comprise slots 3A' to 3F' corresponding to the slots 3A to 3F so that the ordinary printing processing is carried out in the case where one of the various types of recording media or the digital camera 30 has been inserted in the corresponding one of the slots 3A to 3F while the printing processing according to the easy printing conditions is carried out in the case where the recording medium or the digital camera 30 has been inserted in the corresponding one of the slots 3A' to 3F'. In this manner, the printing processing according to the easy printing conditions can be carried out by use of the various types of recording media.

In the embodiment described above, the image processing is carried out on the images to be printed. However, the image processing unit 19 may store parameters for image processing corresponding to the model of the digital camera. In this case, model information regarding the digital camera 30 is obtained when the slot 3A is loaded with the digital camera 30 so that the image processing can be carried out according to the image processing parameters corresponding to the digital camera 30, based on the information on the model of the camera 30 having been obtained.

The invention claimed is:

1. A printing order reception apparatus, comprising:
a display unit carrying out various kinds of display for a print order;
an input unit receiving various kinds of input for the print order;
a plurality of types of slots for inserting therein various types of recording media, each storing an image, and equipment including a recording medium storing an image;
a printing controller configured to execute printing processing according to a predetermined printing condition in the case where a specific one of the slots has a corresponding equipment inserted therein, regarding the image stored in the recording medium in the equipment;
a recording unit configured to record an index image having an optically readable mark area for a print order on a surface of the optical recording medium; and
an image recording unit configured to record an image to be deleted in the optical recording medium that enables optical recording therein, wherein
one of the slots is a slot for the optical recording medium,
the slot for the optical recording medium having a reading unit configured to read the mark area of the index image,
the printing controller is configured to execute the printing processing according to information of the mark area having been read, and
the printing controller is configured to delete the image from the recording medium included in the equipment after execution of the printing processing.

2. The printing order reception apparatus according to claim 1, wherein the printing controller is configured to display a screen on the display unit in order to accept whether to execute the printing processing according to the predetermined printing condition and for executing the printing processing in the case where an instruction to execute the printing processing has been input from the input unit.

3. The printing order reception apparatus according to claim 1, wherein the equipment is a digital camera having a predetermined interface and the specific slot has an interface corresponding to the predetermined interface.

4. The printing order reception apparatus according to claim 1, wherein the printing controller is configured to display a screen on the display unit in order to accept whether to delete the image and for deleting the image in the case where an instruction to delete the image has been input from the input unit.

5. The printing order reception apparatus according to claim 1 wherein the image recording unit is configured to display a screen on the display unit in order to accept whether to record the image in the optical recording medium and configured to record the image in the optical recording medium in the case where an instruction to record the image in the optical recording medium has been input from the input unit.

6. A printing order reception method for a printing order reception apparatus, the printing order reception apparatus having a display unit carrying out various kinds of display for a print order, an input unit receiving various kinds of input for the print order, a plurality of types of slots for inserting therein various types of recording media each storing an image and equipment including a recording medium storing an image, an image recording unit configured to record an image to be deleted in an optical recording medium that enables optical recording therein, a recording unit configured to record an index image having an optically readable mark area for a print order on a surface of the optical recording medium, and a reading unit configured to read the mark area of the index image, the printing order reception method comprising:
reading an optically readable mark area of an index image recorded on a surface of an optical recording medium inserted into a slot of the printing order reception apparatus; and
executing printing processing according to information of the mark area having been read from the index image on the surface of the optical recording medium.

7. A tangible computer readable recording medium encoded with instructions, wherein the instructions when executed on a computer cause the computer to perform a printing order reception method for a printing order reception apparatus having a display unit carrying out various kinds of display for a print order, an input unit receiving various kinds of input for the print order, a plurality of types of slots for inserting therein various types of recording media each storing an image and a digital camera including a recording medium storing an image, an image recording unit configured to record an image to be deleted in an optical recording medium that enables optical recording therein, a recording unit configured to record an index image having an optically readable mark area for a print order on a surface of the optical recording medium, and a reading unit configured to read the mark area of the index image, the printing order reception method comprising:
reading an optically readable mark area of an index image recorded on a surface of an optical recording medium inserted into a slot of the printing order reception apparatus; and
executing printing processing according to information of the mark area having been read from the index image on the surface of the optical recording medium.

8. The printing order reception apparatus according to claim 1, further comprising:
a storage unit configured to store the image to be deleted.

* * * * *